March 12, 1940.    C. W. RICE    2,193,361
HIGH FREQUENCY APPARATUS
Filed April 9, 1936    3 Sheets-Sheet 2
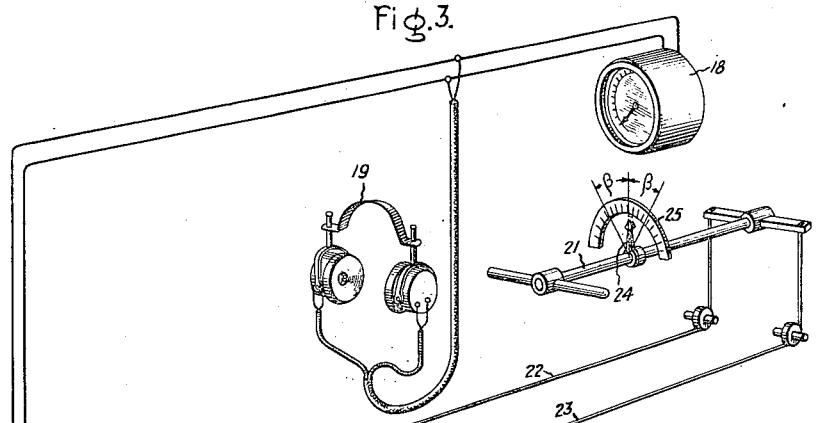
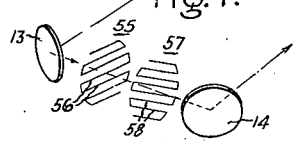
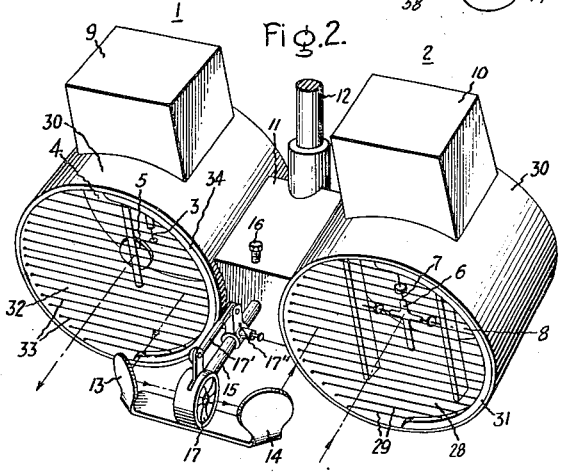
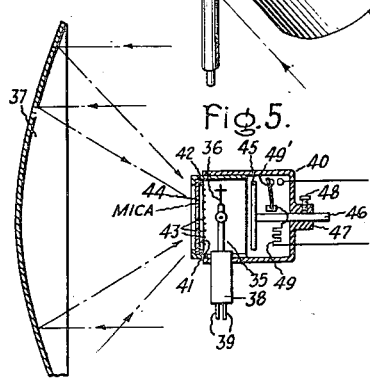
Inventor:
Chester W. Rice,
by Harry E. Dunham
His Attorney.

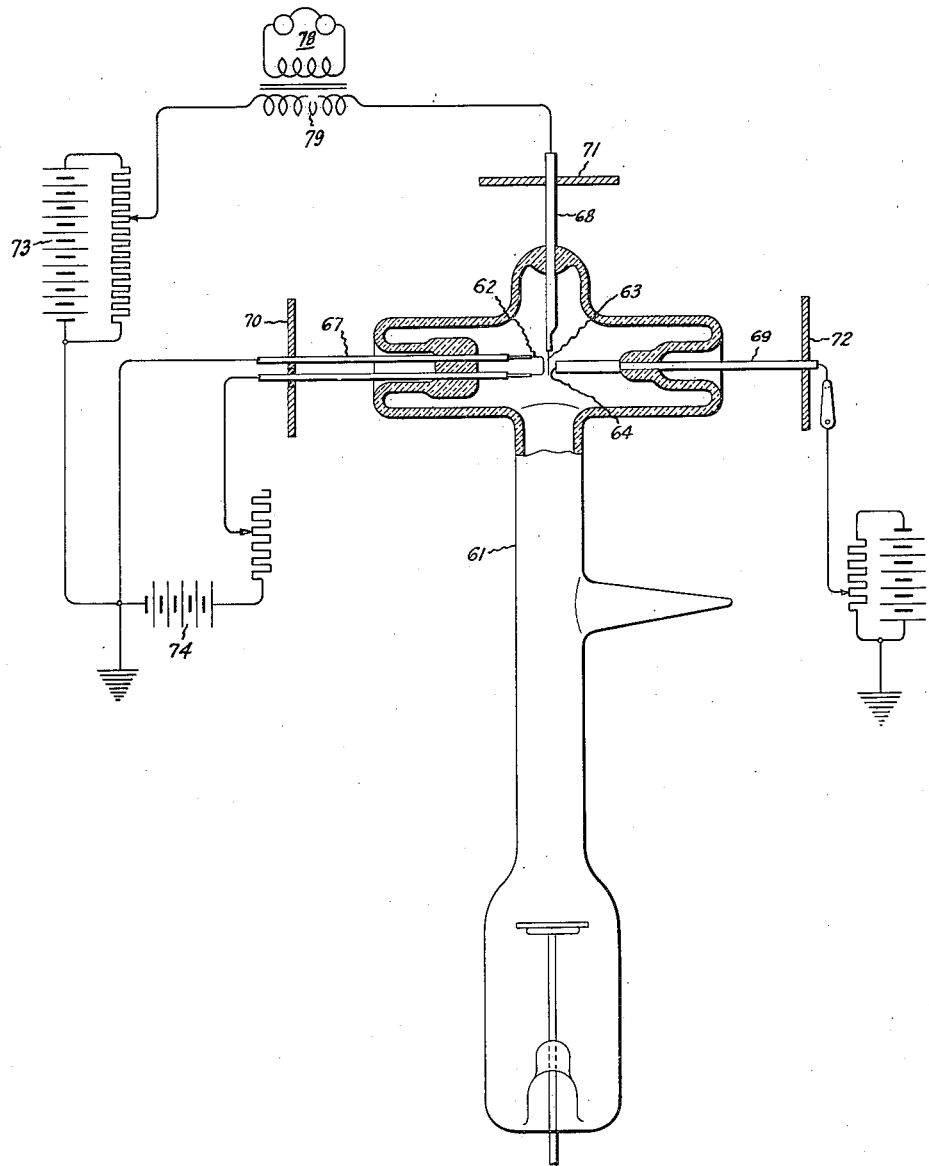

Patented Mar. 12, 1940

2,193,361

UNITED STATES PATENT OFFICE 2,193,361

HIGH FREQUENCY APPARATUS

Chester W. Rice, Schenectady, N. Y., assignor to General Electric Company, a corporation of New York Application April 9, 1936, Serial No. 73,512

11 Claims. (Cl. 250—1)

My invention relates to high frequency apparatus and more particularly to such apparatus adapted for use in determining the relative velocity of moving bodies. It has for one of its objects to provide a novel method and means for determining such relative velocity.

Whenever there is an occasion for determining the relative velocity of two bodies, it is generally desirable to make the determination through the use of equipment all of which may be located at a single point. The equipment may thus be mounted on one of the bodies; as, for example, on an aircraft when it is desired to determine the velocity of the aircraft with respect to the earth. It is, therefore, a further object of my invention to provide means for determining the relative velocity of one body with respect to another in which all the equipment employed may be located at a single point, as on one of the bodies.

A further object of the invention is to provide means whereby waves radiated from one body and subsequently scattered and reflected from another body may be utilized on the first body to determine the relative velocity of the two bodies.

A further object of the invention is to utilize the Doppler principle in connection with such radiated and reflected waves to indicate said relative velocity.

Thus, in accordance with my invention a high frequency radio wave may be transmitted from one body toward another body whereby the wave is scattered and reflected from the second body and is then received on the first body. Since one of the bodies is moving relative to the other, the frequency of the wave arriving back at the first body is different from that of the outgoing radiated wave. This, of course, is by reason of the Doppler effect. In accordance with my invention this difference in frequency between the diffused reflected wave and the outgoing wave is utilized to determine the relative velocity of the two bodies.

Successful application of this method of determining relative velocity depends upon the scattered or reflected radiation which returns to the transmitting body along the line of sight. The amount of scattering produced by the reference body increases rapidly as the wave length is decreased (roughly, according to the inverse fourth power of the wave length) and accordingly it is highly important that very short waves as, for example, waves of less than a meter in length, be employed and I prefer to use waves of but a few centimeters in length.

The degree of error introduced into the determination of the relative velocity depends largely upon the area of the spot on the reference body which the apparatus is responsive to. The area of this spot is, of course, dependent upon the directivity of the transmitting apparatus and should be made as small as possible. This means, of course, that the transmitting or receiving apparatus should be highly directive. The size of the apparatus necessary to give a radio wave the desired high degree of directivity decreases rapidly as the wave length is decreased. It is, therefore, highly important that short wave lengths be used not only because of the necessity of obtaining a large percent of scattered radiation but also because of the desirability of obtaining highly directional properties with apparatus of practical size.

A further object of my invention is to provide short wave transmitting and receiving apparatus which is particularly adapted for use in such application, which is capable of radiating waves of the desired short wave length with requisite directivity and which is capable of practical application to moving craft, such as aircraft for ground speed indication, for example.

The receiving equipment, in accordance with my invention, must respond both to the wave being radiated from the associated transmitting equipment and to the wave received from the distant body through diffused reflection. A further object of my invention is to provide a particularly advantageous means for transferring energy from the transmitter to the receiver. Other objects of the invention relate to the shielding means employed, to means for preventing interference caused by waves of different wave length from those employed, or waves polarized in different planes, and novel means for positioning the receiving equipment relative to the electric field component of the received wave.

The method of determining relative velocity of two bodies by use of the so-called Doppler effect, in certain of its broader aspects, is described and claimed in my copending application Serial No. 73,511 filed simultaneously herewith, entitled High frequency apparatus and which is assigned to the same assignee as my present application.

The novel features which I believe to be characteristic of my invention are set forth with particularity in the appended claims. My invention itself, however, both as to its organization and method of operation, together with further objects and advantages thereof, may best be underof the transmitted wave. In order to obtain a beat frequency in the receiver, a new and novel means is provided for introducing a portion of the wave propagated from transmitter 1 into receiver 2, and for adjusting the intensity and phase of this portion. Referring again to Fig. 2 of the drawings, it will be observed that two relatively small metal reflectors 13 and 14 are secured to a supporting rod 15 and are disposed in front of transmitter 1 and receiver 2 respectively at substantially a 45° angle with respect to the line of propagation of transmitter 1. Reflectors 13 and 14 are thus arranged to reflect a small portion of the wave propagated from transmitter 1 directly to receiver 2. The phase of the reflected portion as detected by receiver 2 of course, depends upon the length of the path traveled by the reflected wave. By sliding rod 15 in or out of block 11 the path length may be varied at will, and consequently, the phase. A set screw 16 associated with rod 15 in block 11 is adapted to hold rod 15 in place after proper adjustment for phase has been made.

The intensity of the portion of the propagated wave reflected directly to receiver 2 may be adjusted by mounting an iris metal diaphragm 17 directly in the path of the reflected wave. For convenience diaphragm 17 is supported by rod 15. The size of the opening in diaphragm 17 depends upon the position of arm 17' and hence may be conveniently adjusted by movement thereof. A clamp 17'' is adapted to secure rod 17' after the desired adjustment for intensity has been made. Since iris diaphragm 17 acts as a shield except for the opening in the center, it is obvious that the size of this opening determines the intensity of the wave directly reflected to receiver 2.

Although two reflectors are shown as a means for passing a portion of the transmitted wave directly to the receiver by radiation, it is obvious that other equivalent means may be used; such, for example, as cutting two small holes (not shown) in the adjacent sides of transmitter 1 and receiver 2.

Referring now to Fig. 3 of the drawings, wherein I have diagrammatically illustrated the apparatus necessary for operation of transmitter 1 and receiver 2 as a ground speed indicator, I have indicated in the output circuit of receiver 2 a frequency responsive device 18 having a scale which is calibrated in miles per hour and a pair of head phones 19 which permits the operator to listen to the beat note of the receiver. By rotating transmitter 1 and receiver 2 about vertical axis 12 until a note of maximum pitch is heard in head phones 19, it is possible to determine the true direction of motion of the vehicle with respect to ground since maximum pitch occurs when transmitter 1 faces the direction of motion. A suitable means is provided for shifting the angular position of the apparatus which includes a control handle 21 mounted in proximity to the frequency responsive device 18 that is connected to axis 12 through cables 22 and 23. A pointer 24 on control rod 21, cooperating with a scale 25, which is calibrated in degrees indicates the angle B between the true direction of motion of aircraft A and the fore and aft line of the craft.

The operation of my device is as follows: Let us assume that the above described apparatus has been mounted on an aircraft and that angle $\alpha$ and wave length $\lambda$ have been adjusted, and that a particular scale corresponding to these adjustments is provided on frequency responsive device 18. A high frequency wave is propagated towards the ground from transmitter 1 and due to the properties of very short waves, scattered radiation occurs when the propagated wave strikes the ground. A portion of the scattered radiation is returned along the line of sight and is detected by receiver 2. Since airplane A is in motion with respect to the ground, the frequency of the returned scattered radiation is different from that of the transmitted wave. Small reflectors 13 and 14 cause a portion of the propagated wave to pass directly to receiver 2. The intensity and phase of this directly reflected portion is adjusted by diaphragm 17 and by adjusting the position of reflectors 13 and 14 for the optimum receiving condition. The beat frequency resulting from the two superimposed waves may be heard in the head phones 19. Control member 21 is now turned until a note of maximum pitch is heard. Frequency responsive device 18 now indicates the true ground speed of the airplane in miles per hour and the angle B indicates the angle between the direction of motion and the fore and aft line of aircraft A.

An apparatus of the type described above should be shielded as much as possible. A metal casing 30 may be employed in conjunction with the metal reflector of both transmitter 1 and receiver 2 of the apparatus which will shield the respective units of the apparatus on all sides but one. The necessity for one open side, however, prevents complete shielding, and in the case of the receiver long wave radio frequency and audio frequency interference are likely to enter the casing, and have been found troublesome at times. To overcome this difficulty it has been found that a polarized filter placed over the open end of metal casing 30 eliminates such disturbance and at the same time passes centimeter radio waves of a predetermined plane of polarization. It is to be understood that hereinafter when reference is made to the "open end" of the shielding container, it refers simply to the portion of the container which does not act as a shield.

In Fig. 2 of the drawings, I have illustrated a filter 28 of this type disposed across the face of receiver 2. Filter 28 includes a plurality of spaced parallel conductors 29. Conductors 29 may be electrically connected together at one end through casing 30 and may be insulated from each other at their opposite end by a strip of insulating material 31, or they may be alternately connected together at opposite ends so as to form a continuous conducting zigzag path (as shown in Fig. 7). An important design feature of the filter appears to be the necessity of having the interconductor spacing small compared with the wave length of the interference in order to effect maximum shielding. The very high frequency waves which are radiated from the antenna of transmitter 1 have their electric field parallel to the antenna and their magnetic field perpendicular thereto. Consequently, conductors 29 should be perpendicular to the antenna of transmitter 1 when it is desired to receive the polarized plane waves of that transmitter. Any wave having an electric field other than perpendicular to conductors 29 will pass only the component thereof which is perpendicular thereto. The magnitude of this component may be determined according to the sine of the angle which the electric field makes with conductors 29. Hence, conductors 29 act for the most part as though they were a metal shield to all waves other than a plane polarized wave whose plane is perpendicular to conductors 29. Antenna member 7 of receiver 2 should be disposed parallel to the plane of polarization of the wave to be received and perpendicular to conductors 29.

A similar filter 32 is provided across the face of transmitter 1 for the purpose of more sharply defining the plane of polarization of the outgoing wave. Filter 32 comprises a plurality of conductors 33 and a strip of insulated material 34 arranged as described in connection with filter 28.

The preferred form of receiving apparatus that is described in my copending application, Serial No. 61,378, filed January 29, 1936, is illustrated in Fig. 4 of the drawings. The receiver comprises an electron discharge device 61 having a U-shaped filament 62, a linear grid electrode 63, and a plate electrode 64. The filament, grid, and plate leads 67, 68, and 69 are each provided with an electrical tuning means such as metal disks 70, 71, and 72 respectively. The grid electrode 63 is given a positive bias with respect to filament 62 by a suitable source of potential 73. A second source of potential 74 supplies the filament current necessary to heat filament 62 to its desired electron emission point. Plate 64 may either be maintained at filament potential, given a negative bias or permitted to float on the system as desired. The output circuit 78 is shown as coupled to the grid circuit through transformer 79. When used in this manner it will be understood that grid conductor 68 acts as the antenna member of the receiver.

It should be observed that while the method of biasing the electron discharge device is similar to the conventional method for providing Barkhausen-Kurz oscillations, the oscillator both with respect to the discharge device and to the circuit in which it is employed departs from the conventional Barkhausen-Kurz type.

In Fig. 5 of the drawings I have illustrated a modified form of shielding for unidirectional high frequency apparatus wherein the parabolic reflector is exterior to the shield and wherein the shield can itself is much smaller than that previously described. An electron discharge device 35 of the type necessary for high frequency operation having an antenna member 36 is shown as being located at the focus of a relatively large parabolic reflector 37. Discharge device 35 is mounted on a base 38, the latter being provided with conducting pins 39 which are adapted to be connected to a source of electric energy. Disposed about discharge device 35 and antenna member 36 is a cylindrical metal shield can 40 provided with an opening in the end opposite to the direction of reception but adjacent the parabolic reflector 37. Since the spacing between the antenna member of the high frequency apparatus and the polarized filter of the type described in connection with Fig. 2 is important, the polarized filter 41 is shown as being mounted in a sleeve 32 which is adapted to be moved in and out of shield can 40. Filter 41 includes a plurality of conductors 43 which are arranged perpendicular to the plane of polarization of the high frequency wave which is to pass through the filter.

Since the stability of operation of high frequency apparatus has been found to be greatly affected by air currents and by varying temperature conditions, a window 44 made from a material transparent to short radio waves such as mica is placed across the outer end of sleeve 42. Although window 44 freely permits the passage of radio waves therethrough it does prevent air movement within the interior of the shield can and tends to maintain constant temperature therein. The temperature within the shield can may be more accurately controlled by providing an electric heater 49 which is under control of a thermostat 49' as shown. Close temperature regulation within the shield can improves the operating characteristics of the high frequency apparatus.

The output intensity of the high frequency apparatus may be further increased by providing a small plane reflector 45 within the shield can on the side of the apparatus opposite from parabolic reflector 37. When the high frequency apparatus is acting as a receiving unit, reflector 45 has the advantage of reflecting energy back on to grid conductor 36. When the high frequency apparatus is operating as a transmitting unit reflector 45 causes one loop of the double loop radiation pattern to be folded back on itself thus concentrating substantially all of the transmitted energy on parabolic reflector 37.

Since the position of reflector 45 with respect to the antenna member 36 and the electron discharge device 35 should be adjusted for optimum output, reflector 45 is mounted on a rod 46 which may be slid back and forth in end wall 47 of shield can 40. A set screw 48 is provided to maintain reflector 45 in place after its desired position has been found.

Where the spacing between the polarized filter and the electron discharge device is small, it is sometimes desirable to employ more than one filter in order to reduce the electrostatic "reach-in" effect of the interference. Fig. 6 illustrates diagrammatically this effect and shows the use of a plurality of filters. The electron discharge device 51 of the receiver is mounted in the manner described in connection with Fig. 5 within a shield can 52. Two polarized filters 53 and 54 are mounted over the non-shielded end of shield can 52. The wavy line "e" depicts an electrostatic equi-potential line. Were only one filter 53 used, this same equi-potential line would extend much further into shield can 52. When a second filter 54 is placed in proximity to filter 53 the conductors of filter 54 being of zero potential tend to crowd the equipotential lines back out of the container. Each additional filter stage added increases this crowding out effect, and hence, further reduces the "reach-in" effect of the interference. From a practical standpoint it has generally been found that a two-stage filter is sufficient.

In Fig. 7 of the drawings I have illustrated a different means for controlling the intensity of a wave reflected from the transmitter 1 of the receiver 2 of Fig. 2. In place of the iris diaphragm 17, a polarized filter 55 is provided. This filter comprises a plurality of spaced parallel conductors 56 and while it may be of either of the types previously described I prefer to connect the parallel conductors in zigzag formation as shown. Since filter 55 freely passes a plane polarized wave when conductors 56 are perpendicular to the electric vector of that wave and acts as a shield when conductors 56 are parallel to the electric vector, a simple means for controlling the intensity is obtained by varying the angular position of conductors 56 between these two extremes according to the intensity of wave which it is desired to pass. A second filter 57 may be provided to obtain a more accurate adjustment of intensity. Filter 57 is similar in construction to filter 50 and comprises a plurality of conductors 58 connected in zigzag formation.

Although I have described as the preferred embodiment of my invention, the use of high frequency apparatus which includes not only a highly directive transmitting unit but also a highly directive receiving unit, it will be understood that this is by way of preference and that if desired only one of the units may have highly directive properties. If a highly directive transmitter is used in conjunction with a non-directive receiver, only an isolated area on the reference body is affected by the transmitter and hence scattering and reflection occur only from that area, and the apparatus as a whole maintains its requisite directional properties. If a highly directive receiver be used in conjunction with a non-directional transmitter, scattering and reflection will occur over a large area of the reference body but since the receiver is only responsive to the scattering and reflection which occurs at a small spot on the surface of the reference body, the apparatus as a whole maintains its requisite directional properties.

While I have shown particular embodiments of my invention, it will of course be understood that I do not wish to be limited thereto since many modifications may be made both in the circuit arrangement and in the instrumentalities employed, and I therefore contemplate by the appended claims to cover all such modifications as fall within the true spirit and scope of my invention.

What I claim as new and desire to secure by Letters Patent of the United States is:

1. The combination on a craft moving above a reflecting surface, of means for projecting waves from said craft toward said reflecting surface and receiving said waves on said craft after reflection from said surface, said wave receiving means including means responsive only to waves received in a particular direction, means to vary said direction relative to the direction of motion of said craft to vary the frequency of the received waves to a limit which occurs when said direction corresponds to the direction of motion of said craft, and additional means responsive to variations in frequency of the received waves which occur during the variations in direction produced by said last means.

2. The method of determining the velocity of aircraft relative to the earth which includes radiating radio waves from said craft toward the earth, receiving said waves upon the craft after impingement upon the earth, and determining said velocity from the frequency of said received waves.

3. The method of determining the velocity of aircraft relative to the earth which includes radiating radio waves from said craft toward the earth, receiving said waves at said craft after reflection of said waves from the earth, said waves being propagated at an acute angle to the earth, said angle being in the direction of motion of the aircraft, whereby the frequency of the received wave varies in accordance with the velocity of the craft, and determining the velocity of said craft on said craft from the frequency of the received waves.

4. The combination in an aircraft, of means to radiate short radio waves toward the earth and at an acute angle thereto, said angle being in the direction of motion of the craft, a receiver to receive said waves from the earth, the wavelength of said waves being sufficiently short that said waves are received by said receiver, and means responsive to the frequency of said received waves to operate in accordance with said velocity of said craft.

5. In combination with a high frequency radio apparatus and a relatively large parabolic reflector, a small shield can disposed about the active portion of said apparatus having an opening therein on the side facing said parabolic reflector, a plane polarized filter disposed across the face of said opening, and a sheet of material transparent to short radio waves disposed across and sealing said opening, said apparatus being located substantially at the focus of said parabolic reflector.

6. The combination of a parabolic reflector, a high frequency apparatus having an antenna member located substantially at the focus of said parabolic reflector, a shield can small relative to said reflector disposed about the active portion of said antenna having an opening therein on the side facing said parabolic reflector, a plane polarized filter disposed across the face of said opening, a sheet of material transparent to short radio waves to seal said opening, and means for varying the spacing between said antenna and said opening.

7. The combination, on an aircraft, of means for projecting waves from said craft toward the earth and receiving said waves after reflection from the earth in the same direction in which they are projected, means to vary said direction relative to the direction of motion of said craft over the earth to vary the frequency of the received waves to a limit which occurs when said direction most nearly corresponds to the direction of motion of the craft, and means responsive to the frequency of the received waves to indicate the velocity of the craft with reference to the earth when said frequency of the received waves is at said limit.

8. The method of determining the velocity of aircraft with respect to the earth, which comprises radiating waves of short wave length from the craft toward the earth, receiving said waves on the craft after reflection from the earth, combining the received waves with the reflected waves, said waves being radiated at such an angle to the earth that a beat note is produced between the transmitted and received waves when said waves are combined, and determining the velocity of the craft with respect to the earth from the frequency of said beat note.

9. The method of determining the velocity of aircraft with respect to the earth, which comprises radiating waves of short wave length from the craft toward the earth, receiving said waves on the craft after reflection from the earth, combining the received waves with the reflected waves, said waves being radiated at such an angle to the earth that a beat note is produced between the transmitted and received waves when said waves are combined, varying the direction in which said waves are radiated relative to the direction of movement of the craft until said beat note is a maximum, and determining the velocity of the craft with respect to the earth from the frequency of the beat note.

10. In a system for determining the velocity of aircraft with respect to the earth which comprises means to project a radio wave of constant frequency toward the earth, means to receive said waves after reflection from the earth from substantially the same direction in which they were projected, said direction being inclined to the earth in the direction of motion of the craft, means to combine the received wave with waves of the frequency of the projected waves to produce a beat note having a frequency dependent upon the velocity of the craft relative to the earth and means responsive to the frequency of the beat note.

11. In a system for determining the velocity of aircraft with respect to the earth which comprises means to project a radio wave of constant frequency toward the earth, means to receive said waves after reflection from the earth from substantially the same direction in which they were projected, said direction being inclined to the earth in the direction of motion of the craft, means to combine the received waves with waves of the frequency of the projected waves to produce a beat note having a frequency dependent upon the velocity of the craft relative to the earth, means to vary the direction in which said waves are projected through an arc until said beat note has its maximum frequency, and means responsive to the frequency of the beat note.

CHESTER W. RICE.

Patented Mar. 12, 1940

2,193,363

UNITED STATES PATENT OFFICE 2,193,363

PROCESS FOR OBTAINING BERYLLIUM AND BERYLLIUM ALLOYS

Carlo Adamoli, Milan, Italy, assignor to Perosa Corporation, Wilmington, Del., a corporation of Delaware No Drawing. Application May 24, 1937, Serial No. 144,411. In Italy June 6, 1936

13 Claims. (Cl. 75—84)

The present invention relates to a process for directly obtaining in a single operation starting from compounds containing beryllium, beryllium, more particularly in the state of alloys with one or more alloying elements capable of alloying with beryllium, as well as, if desired, in the state of pure metallic beryllium.

It is known how many difficulties of chemical, thermal and technical nature are presented by the problem of effecting by direct reaction starting from beryllium compounds, the production of beryllium alloys with determined contents, in particular of a high beryllium content, as well as of pure beryllium.

It has never been possible up to now despite numerous attempts, to effect with industrial yields the production of beryllium and of its alloys by thermo-chemical treatment of beryllium compounds.

The difficulties of chemical and thermal nature met with in decomposing beryllium compounds arise in particular from the fact that the exchange reactions which take place are very quickly checked or give rise to the formation of products which hinder them being carried out under the conditions in which it is desired to operate. From the technical point of view these difficulties are increased by the lightness of the beryllium which tends to float upon the slag and to be maintained separate from any heavy metal present, by the high melting point of beryllium and by its great tendency to be oxidised or to form carbides.

In the presence of all these difficulties it has been proposed to use for replacing thermo-chemical treatments, electrolytic processes, but none the less without arriving, by reason in particular of the necessarily very high cost of the manufacture, at obtaining industrial results and being able to effect this manufamture upon an industrial scale.

One is thus brought back to the thermo-chemical method for the production of beryllium and its alloys by treatment with a decomposing bivalent metal such as magnesium, of a fluorine-containing compound of beryllium, that is a double fluoride of beryllium and an alkali metal (sodium) less rich in sodium fluoride than the double fluoride BeF$_2$.2NaF.

The practical impossibility in fact had been established which is met with in operating with the double fluoride according to the reaction BeF$_2$.2NaF+2Mg=Be+2Na+2MgF$_2$ which is rendered explosive by reason of the liberation of sodium and this is the reason in particular why instead of the double fluoride BeF$_2$.2NaF the complex fluoride BeF$_2$.NaF is treated according to the reaction:

2BeF$_2$.NaF+Mg=Be+MgF$_2$+BeF$_2$.2NaF

This reaction would seem to be rendered possible here by the fact that the sodium fluoride and magnesium fluoride formed are present in a ratio such that the reversibility of the reaction which would lead to the setting free of sodium is prevented. However, as seen, the reaction thus effected does not lead to the liberation in the metallic state of more than half the beryllium contained in the compound treated, the other half of beryllium remaining in the residue in the form of a complex compound from which the said beryllium may be extracted for example in the form of double fluoride. From this there results a large diminution of the yield of the operation and a corresponding increase in the net cost of the manufacture.

Thus the processes known up to now have not permitted a solution of the problem of the industrial manufacture of beryllium and its alloys.

This problem is solved nevertheless in a simple and practical manner by the present invention and that in conditions where there is effected in a direct and complete manner and with a high yield practically reaching 100%, the production of beryllium, more particularly in the state of alloys with predetermined contents, whatever these may be, and in particular with a beryllium content above 25% or as high as is desired.

Although none of the known processes permitted practically complete reactions to be effected, the new process which forms the subject of the invention permits such quantitative reactions to be regularly effected and obtained, while allowing to be obtained with practically total maximum yield alloys of beryllium with determined contents starting from any compound of beryllium capable of being decomposed by a metal or metalloid whether these compounds are contained in ores or obtained by treatment of these latter and more particularly starting from fluorine-containing compounds of beryllium.

The invention consists for this purpose in its most general aspect in effecting an integral displacement of the beryllium from its compounds and notably from its fluorine-containing compounds by means of metals or metalloids capable of liberating the beryllium therefrom, by causing to act a quantity of this metal or metalloid such that it corresponds substantially stoichiometrically to the quantity of beryllium contained in the compound treated so as to displace from it up to the whole of the beryllium, by a reaction of quantitative exchange; one thus practically liberates all the beryllium in the state of pure metal or, in general, by operating in the presence of one or more metals, or, if desired, metalloids, capable of alloying with the beryllium, in the state of beryllium alloys with determined contents.

In the following, for the purpose of simplification the metals or metalloids which are caused to act to displace, due in particular to their electro-positive character, which is more electropositive than beryllium, the beryllium from the compounds treated, will be designated under the term "decomposing elements" (metals or metalloids).

The complete exchange reaction is effected in general by a simple fusion operation. For this purpose one may mix for example in the cold the reacting materials: compounds of beryllium and decomposing metals or metalloids and simply melt them together, this single fusion operation ensuring the complete chemical transformation by double exchange which is effected if the stoichiometrical proportions have been used, without having recourse to any special operating means.

The operation may be effected advantageously in an electric induction furnace such as a high frequency furnace, but it is obvious that all known operating methods and apparatus which are suitable may equally well be employed.

As compounds of beryllium to be treated there may be used as has been indicated above any compounds, or even ores containing them, capable of being decomposed by the process according to the invention. There are utilised, however, more particularly fluorine-containing compounds constituted either for example by beryllium fluoride or by a double fluoride of beryllium and an alkali metal called in general "beryllium and akali double fluoride" (for example a double fluoride of beryllium and sodium) or by a mixture of simple beryllium fluoride, and beryllium and alkali double fluoride; it should be stated that the beryllium fluoride which is utilised is an anhydrous fluoride practically free from oxide, in contrast to the usual products which comprise a substantial proportion of beryllium oxide, not fusible at the temperature of the operation and non-reducible, not permitting in consequence the whole of the beryllium to be extracted; the beryllium fluoride is conveniently employed in this form in many cases by reason in particular of the fact that it considerably increases the fusibility of the slags which are formed thus facilitating the separation of the metallic products and the slags.

According to the invention the fluorine-containing compound of beryllium is advantageously treated in the presence of or in admixture with a fluoride of another metal, preferably at least bivalent, such as the fluoride of magnesium or of an alkaline earth metal.

The interest in operating in the presence of such a fluoride of an alkaline earth metal or magnesium, according to the invention, in particular in the case where a beryllium and alkali double fluoride is treated, may be explained by the fact that this alkaline earth or other fluoride acts as a neutralizer preventing the setting free, during the reaction, of the alkali metal of the double fluoride treated, and, due to the fact that just the necessary stoichiometrical proportion of the metal or metalloid which acts as decomposing element is caused to act, there is thus effected an integral displacement of the beryllium of the compound treated without danger of setting free alkali metal (for example sodium).

Thus, for example, in the case where the double fluoride of beryllium and sodium is treated in the presence of calcium fluoride the operation follows the recation:

$$BeNa_2F_4 + Mg + n(CaF_2) = 2NaF + MgF_2 + Be + n(CaF_2)$$

the ($CaF_2$) added acting as a neutralizer due to which all the sodium remains fixed by the fluorine in the form of NaF.

By thus utilising for extracting all beryllium from a molecule of $BeNa_2F_4$, a single molecule of Mg (instead of two molecules of Mg which would necessitate the corresponding reaction when liberating sodium) there has been effected under the optimum conditions the quantitative reaction:

$$BeNa_2F_4 + Mg = Be + 2NaF \cdot MgF_2$$

To sum up, the utilisation of a fluoride of a bivalent metal, such as an alkaline earth metal or magnesium, in the presence of which the operation is carried out, prevents the setting free of sodium or other alkali metal which the compound of beryllium treated may comprise, due to the fact that it tends to decompose preferentially to sodium fluoride and by its tendency to set free fluorine it favours a reaction which ensures the fixation of the fluorine by the sodium in the form of NaF in particular.

In the case of obtaining beryllium alloys it may be of interest to add moreover to the slags alkali or alkalinised salts which are not oxygenated, such as for example as fluorides and chlorides, in order to modify the fusibility of the slags according to the nature of the alloys to be obtained.

The proportions of reacting materials to be employed according to the invention may be determined in advance by calculation to effect the desired quantitative reactions.

If: A, is the quantity of beryllium compound treated;
B, the quantity of beryllium alloy to be obtained;
a, the beryllium content of the beryllium compound treated;
b, the beryllium content of the alloy to be obtained;
C, the quantity of decomposing metal or metalloid to be caused to act;
E, the chemical equivalent of beryllium;
e, the chemical equivalent of the decomposing metal or metalloid employed, the necessary proportions of reacting materials, which should be approached as closely as possible are the following:

The quantity A of the compound of beryllium to be decomposed is determined by the expression:

$$A = B \times \frac{b}{a}$$

The quantity C of the decomposing metal or metalloid necessary to be employed is determined by the equation:

$$C = \frac{B \times b}{100} \times \frac{E}{e}$$

One may thus say that there is caused to act